(12) United States Patent
McKee et al.

(10) Patent No.: US 9,753,789 B2
(45) Date of Patent: Sep. 5, 2017

(54) DISTRIBUTED SYSTEM FOR SCHEDULING ACTION REQUESTS

(75) Inventors: Paul F. McKee, London (GB); Michael A. Fisher, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 103 days.

(21) Appl. No.: 13/638,787

(22) PCT Filed: Mar. 31, 2011

(86) PCT No.: PCT/GB2011/000509
§ 371 (c)(1),
(2), (4) Date: Oct. 1, 2012

(87) PCT Pub. No.: WO2011/121315
PCT Pub. Date: Oct. 6, 2011

(65) Prior Publication Data
US 2013/0031157 A1  Jan. 31, 2013

(30) Foreign Application Priority Data

Mar. 31, 2010 (EP) .................................... 10250690

(51) Int. Cl.
*G06F 15/16* (2006.01)
*G06F 9/54* (2006.01)
(Continued)

(52) U.S. Cl.
CPC ............ *G06F 9/542* (2013.01); *H04L 67/125* (2013.01); *H04L 67/148* (2013.01); *H04L 61/30* (2013.01)

(58) Field of Classification Search
CPC ................................................ G06F 17/30569
See application file for complete search history.

(56) References Cited

U.S. PATENT DOCUMENTS 5,159,597 A * 10/1992 Monahan et al. ................ 714/2
5,889,953 A    3/1999 Thebaut et al.
(Continued)

FOREIGN PATENT DOCUMENTS

EP    0 458 556        11/1991
EP    0 458 556 A2     11/1991
(Continued)

OTHER PUBLICATIONS

Dong-Il Ko et al., "Design of network protocols for distributed virtual environments", Multimedia Computing and Systems, 1999, IEEE International Conference, Florence, Italy, Jun. 7-11, 1999; Los Alamitos, CA, USA, IEEE Comput. Soc., US, vol. 2, Jun. 7, 1999 (6 pgs.).

(Continued)

*Primary Examiner* — Yves Dalencourt
(74) *Attorney, Agent, or Firm* — Nixon & Vanderhye P.C.

(57) ABSTRACT

A computing node in a distributed system comprising a processor and associated memory, said memory storing: software component code executable to provide a service to software components running on other computers in said distributed system; component monitoring code executable to generate an event message for distribution in said distributed system in response to the occurrence of an event pertaining to the performance of said software component; action request assembly code executable to store an assemblage of action requests received from other computers in said distributed system in reaction to the distribution of said event message in said memory; action request assemblage processing code executable to order and/or filter said assemblage of action request to generate a processed set of action requests for execution by said software component.

12 Claims, 8 Drawing Sheets

(51) Int. Cl.
 H04L 29/08 (2006.01)
 H04L 29/12 (2006.01)

(56) References Cited

U.S. PATENT DOCUMENTS

| | | | |
|---|---|---|---|
| 6,088,659 A * | 7/2000 | Kelley et al. | 702/62 |
| 6,327,618 B1 | 12/2001 | Ahlstrom et al. | |
| 6,362,836 B1 | 3/2002 | Shaw | |
| 6,467,050 B1 | 10/2002 | Keung | |
| 6,601,082 B1 | 7/2003 | Durham et al. | |
| 7,373,659 B1 | 5/2008 | Vignoles et al. | |
| 7,912,804 B1 | 3/2011 | Talwar et al. | |
| 2005/0021733 A1 | 1/2005 | Clinton | |
| 2007/0112947 A1 | 5/2007 | Anderson et al. | |
| 2007/0169167 A1 | 7/2007 | Morimura et al. | |
| 2008/0184201 A1 | 7/2008 | Burns et al. | |
| 2008/0271022 A1 | 10/2008 | Strassner et al. | |

FOREIGN PATENT DOCUMENTS

| | | |
|---|---|---|
| EP | 1 411 710 | 5/2004 |
| GB | 2 354350 | 3/2001 |
| TW | 200410524 | 6/2004 |
| WO | 03/083734 | 10/2003 |
| WO | 03/084130 | 10/2003 |
| WO | 2008/058570 | 5/2008 |

OTHER PUBLICATIONS

Michael W. Shapiro, "Self-healing in modern operating system", Queue, vol. 2, No. 9, Dec. 1, 2004, (10 pgs.).

"Policy Core Information Model—Version 1 Specification", IETF RFC 3060, Feb. 2001—see http://datatracker.ietf.org/doc/rfc3060/, 2 pgs.

"A Framework for Policy-based Admission Control", IETF RFC 2753, Jan. 2000—see http://datatracker.ietf.org/doc/rfc2753/, 2 pgs.

Shankar, Chetan et al, "Ordering Management Actions in Pervasive Systems using Specification-enhanced Policies", Proceedings of the Fourth Annual IEEE Conference on Pervasive Computing and Communications, 2006, 5 pgs.

Shankar, Chetan, et al, "A Policy-Based Management Framework for Pervasive Systems using Axiomatized Rule-Actions", Proceedings of the Fourth IEEE International Symposium on Network Computing and Applications, 2005, 4 pgs.

Shankar, Chetan, et al, "Specification-Enhanced Policies for Automated Management of Changes in IT Systems", 20th Large Installation System Administration Conference, 2006—see http://static.usenix.org/event/lisa06/tech/full_papers/shankar/shankar.pdf, 16 pgs.

Lewis et al, "Policy-Based Management for Resource-Specific Semantic Services", in proceedings of the 1st Annual Workshop on Distributed Autonomous Network Management Systems, Co-located with the 3rd IEEE International Conference on Autonomic Computing, Dublin, Ireland, Jun. 2006—see http://www.tara.tcd.ie/bitstream/2262/30807/1/danms06_lewis.pdf, 8 pgs.

Lupu, E. et al, "Conflicts in Policy-Based Distributed Systems Management", IEEE Transactions on Software Engineering, vol. 25, No. 6, Nov. / Dec. 1999—see http://pubs.doc.ic.ac.uk/PolicyConflicts/PolicyConflicts.pdf, 18 pgs.

Koch, T. et al, "Towards a Comprehensive Distributed Systems Management", in K. Raymond and L. Armstrong, editors, Open Distributed Processing, pp. 259-270, IFIP, Chapman & Hall, 1995, 12 pgs.

International Search Report for PCT/GB2011/000509, dated Jul. 21, 2011.

Shapiro et al., "Self-healing in modern operating systems", Queue, vol. 2, No. 9, Dec. 1, 2004, p. 66.

International Search Report (5 pgs.) dated Jul. 21, 2011 issued in International Application No. PCT/GB2011/000509.

Smith, W., "A System for Monitoring and Management of Computational Grids", Proceedings of Intl Conference on Parallel Processing, Aug. 18, 2002, 8 pgs.

Dunagan, J. et al, "FUSE: Lightweight Guaranteed Distributed Failure Notification", 4th Symposium on Operating Systems Design and Implementation, Oct. 23-25, 2000, 16 pgs.

Strassner et al, "The Policy-Continuum Policy Authoring and Conflict Analysis", Computer Communications 31 (2008) 2981-2995, 16 pgs.

Wies, "Policies in Network and Systems Management—Formal Definition and Architecture", JNSM vol. 2, No. 1 pp. 63-83, Mar. 1994, 17 pgs.

Wies, "Policy Definition and Classification: Aspects, Criteria and Examples", Proceeding of the IFIP/IEEE International Workshop on Distributed Systems: Operations & Management, Toulouse, France, Oct. 10-12, 1994, 12 pgs.

Holzmann, Gerard, "The Model Checker SPIN", IEEE Transactions on Software Engineering, vol. 23, No. 5, May 1997—see http://spinroot.com/spin/Doc/ieee97.pdf, 17 pgs.

"Terminology for Policy-Based Management", IETF RFC 3198, Nov. 2001—see http://datatracker.ietf.org/doc/rfc3198/, 2 pgs.

Gao, Zhoumin, "Conflict of Handling in Policy-Based Security Management", Thesis presented to the University of Florida, 2002—see http://etd.fcla.edu/UF/UFE1000124/gao_z.pdf, 57 pgs.

* cited by examiner

| Sequence: Interacting Actions – With Predetermined Correct Ordering | |
|---|---|
| Sequence ID | Ordered List of Actions |
| SQ1 | stopComponent(*) -> stopContainer() -> startContainer() -> loadComponent(*) -> startComponent(*) |

Figure 7

| Unordered Action Queue | |
|---|---|
| Event ID | Queued Actions |
| E1 | stopComponent(X); loadComponent(X); startComponent(X); stopContainer(); startContainer() |

Figure 8

| Processed Action Queue | |
|---|---|
| Event ID | Actions for Execution |
| E1 | stopComponent(X); stopContainer(); startContainer();loadComponent(X); startComponent(X) |

Figure 9

Figure 10

DISTRIBUTED SYSTEM FOR SCHEDULING ACTION REQUESTS

This application is the U.S. national phase of International Application No. PCT/GB2011/000509 filed 31 Mar. 2011 which designated the U.S. and claims priority to EP Patent Application No. 10250690.4 filed Mar. 31, 2010, the entire contents of each of which are hereby incorporated by reference.

The present invention relates to a distributed system and a method of operating a distributed system. It has particular utility in relation to so-called publish/subscribe systems.

Modern distributed software applications are increasingly assembled by composition from pre-existing software components. These components may be provided on a pay-per-use basis by third parties, as in Software as a Service (SaaS), Platform as a Service (PaaS) or Infrastructure as a Service (IaaS) offerings. Assembly may be dynamic and systems may be reconfigured on short timescales. The growing use of virtualization techniques that break the traditionally tight coupling between software and the hardware on which it runs gives greater flexibility than has previously been available, but makes the automatic administration of distributed applications even more difficult.

One approach to the automatic administration of Information Communications and Technology (ICT) systems (in particular, the provision of a pre-defined quality of service in communications networks) is to use policy documents which can be created by an administrator and stored on networked devices (e.g. routers) which the administrator manages. Those devices are then provided with software which can automatically interpret those policies. A problem arises if two or more policies trigger conflicting actions.

Most approaches to resolving conflicts of this type have focussed on removing the potential for conflicts at design time, by collecting all the policies which might apply to a given network and editing the policy set to resolve conflicts. Others have proposed the inclusion of some sort of relative authority indication in the policy to allow a Policy Decision Point in the network to determine at run-time which of the conflicting policies should overrule the other(s).

However the above proposals require management of the distributed system to be centralized in so far as all policies must be available for analysis. This is an impractical requirement—it is built on one of the fallacies of distributed computing identified by Peter Deutsch—namely the assumption that there is only one administrator in a distributed system.

Where a managed entity in a distributed system is subject to direct or indirect management by different administrators, then there is a risk that a managed entity can react chaotically to an event in the distributed system because the policies written by the different administrators specify that conflicting or interacting actions should be carried out by the managed entity in reaction to the event.

According to a first aspect of the present invention, there is provided a method of operating a distributed system, said method comprising:
receiving action sequence data representing one or more recommended sequences of actions for a managed entity in said distributed system;
collecting a plurality of actions requested of said managed entity in response to the occurrence of an event in said distributed system;
generating a schedule of actions in accordance with said action sequence data; and
operating said managed entity to perform actions in accordance with said schedule.

By collecting a plurality of actions requested of a managed entity in response to the occurrence of an event in a distributed system, generating a schedule of at least some of those actions in accordance with one or more stored recommended sequences of actions for said managed entity, and having the managed entity carry out those actions in accordance with the generated schedule, the response of the managed entity to the event is less chaotic than might otherwise be the case.

According to a second aspect of the present invention, there is provided a method of operating a computing node in a distributed system, said method comprising:
receiving action sequence data representing one or more recommended sequences of actions for a managed entity in said distributed system;
collecting a plurality of actions requested of said managed entity in response to the occurrence of an event in said distributed system;
generating a schedule of actions in accordance with said action sequence data; and
sending instructions to said managed entity to perform actions in accordance with said schedule.

According to a third aspect of the present invention, there is provided a computing node for use in a distributed system, said computing node comprising:
means for receiving action sequence data representing one or more recommended sequences of actions for a managed entity in said distributed system;
means for collecting a plurality of actions requested of said managed entity in response to the occurrence of an event in said distributed system;
means for generating a schedule of actions in accordance with said action sequence data; and
means for sending instructions to said managed entity to perform actions in accordance with said schedule.

According to a fourth aspect of the present invention, there is provided a computer readable medium on which is encoded instructions executable by a computer to control said computer to:
receive action sequence data representing one or more recommended sequences of actions for a managed entity in said distributed system;
collect a plurality of actions requested of said managed entity in response to the occurrence of an event in said distributed system;
generate a schedule of actions in accordance with said action sequence data; and
send instructions to said managed entity to perform actions in accordance with said schedule.

In some embodiments, the managed entity is a software process or software application running on a computer.

There now follows a description of specific embodiments of the present invention. This description is given with reference to the accompanying drawings in which:

DESCRIPTION OF A SPECIFIC EMBODIMENT

A distributed system (FIG. 1) includes three administrative domains interconnected via the global Internet 106.

Figure 1:
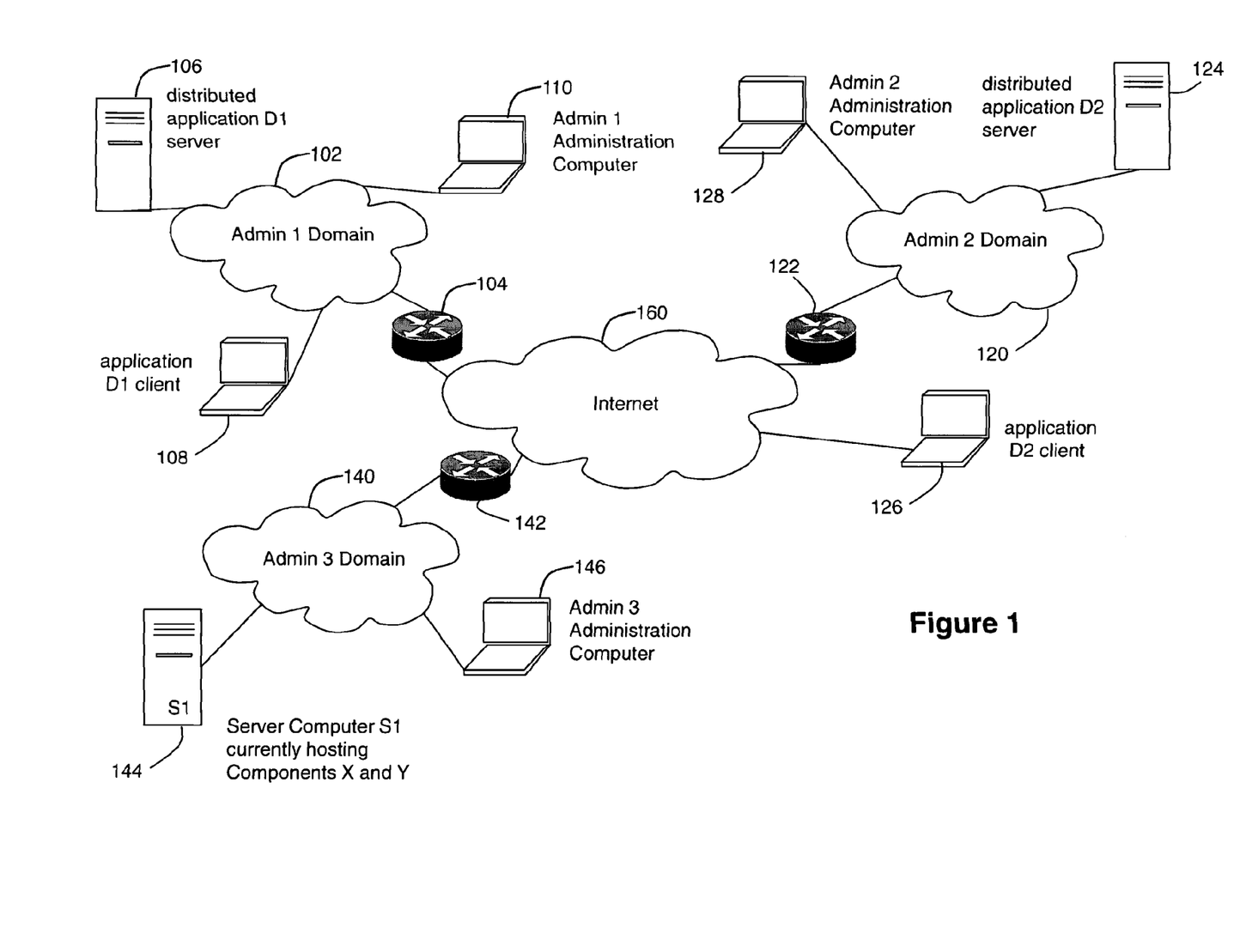
FIG. 1 shows a distributed system spanning three separately administered domains connected to one another via the global Internet.

A first administrative domain includes a network 102 to which is connected a first distributed application server computer 106 which offers clients connected to the Internet 160 usage of a first distributed application program, whose overall control is handled by the first distributed application server computer 106. As is the case with distributed application programs, the distributed application server computer 106 relies on one or more other server computers to provide part of the functionality of the distributed application. In the present example, a client of the first distributed application server program runs on a computer 108 connected to the first administrative domain network 102. Management of the first distributed application program is performed by a first administrator who is able to introduce policies which control the operation of the first distributed application program using a first administration computer 110 connected to the first administrative domain network 102.

The first administrative domain network 102 is connected to the global Internet 160 via internetwork router 104. This interconnection to the global Internet 160 provides a communications channel through which the first distributed application computer is able to call upon the services of remote software components to perform part of the distributed application.

A second administrative domain includes a network 120 to which a second distributed application server computer 124 is connected. The second distributed application server computer 124 offers clients connected to the Internet 160 usage of a second distributed application program, whose overall control is handled by the second distributed application server computer 124. Once again, the distributed application server computer 124 relies on one or more other server computers to provide part of the functionality of the distributed application. In contrast to the situation described in relation to the first distributed application program, a client of the second distributed application server program runs on a computer 126 indirectly connected to the second administrative domain network 120 via the global Internet 160. Management of the second distributed application program is performed by a second administrator who is able to introduce policies which control the operation of the second distributed application program using a second administration computer 128 connected to the second administrative domain network 120.

The second administrative domain network 120 is connected to the global Internet 160 via internetwork router 122. This interconnection to the global Internet 160 provides a communications channel through which the second distributed application computer 124 is able to call upon the services of remote software components to perform part of the distributed application. Furthermore it provides the communications channel through which the client of the second distributed application 126 is able to call upon the services of the distributed application server computer 124.

Finally, a third administrative domain includes a network 140 to which a software component hosting computer 144 is connected. In this present example, the software component hosting computer 144 offers the functionality of a first software component (component X) to the first distributed application server computer 106 and a second software component (component Y) to the second distributed application server computer 124. In other words, distributed application D1 includes software component X, and distributed D2 includes software component Y.

Management of the software platform supporting software component X and software component Y in the third administrative domain is performed by a third administrator who is able to introduce policies which control the operation of the software platform using a third administration computer 146 connected to the third administrative domain network 140.

The third administrative domain network 140 is connected to the global Internet 160 via internetwork router 142. This interconnection to the global Internet 160 provides a communications channel through which the first and second distributed application computers 106, 124 are able to call upon the services of software component X.

Figure 2:
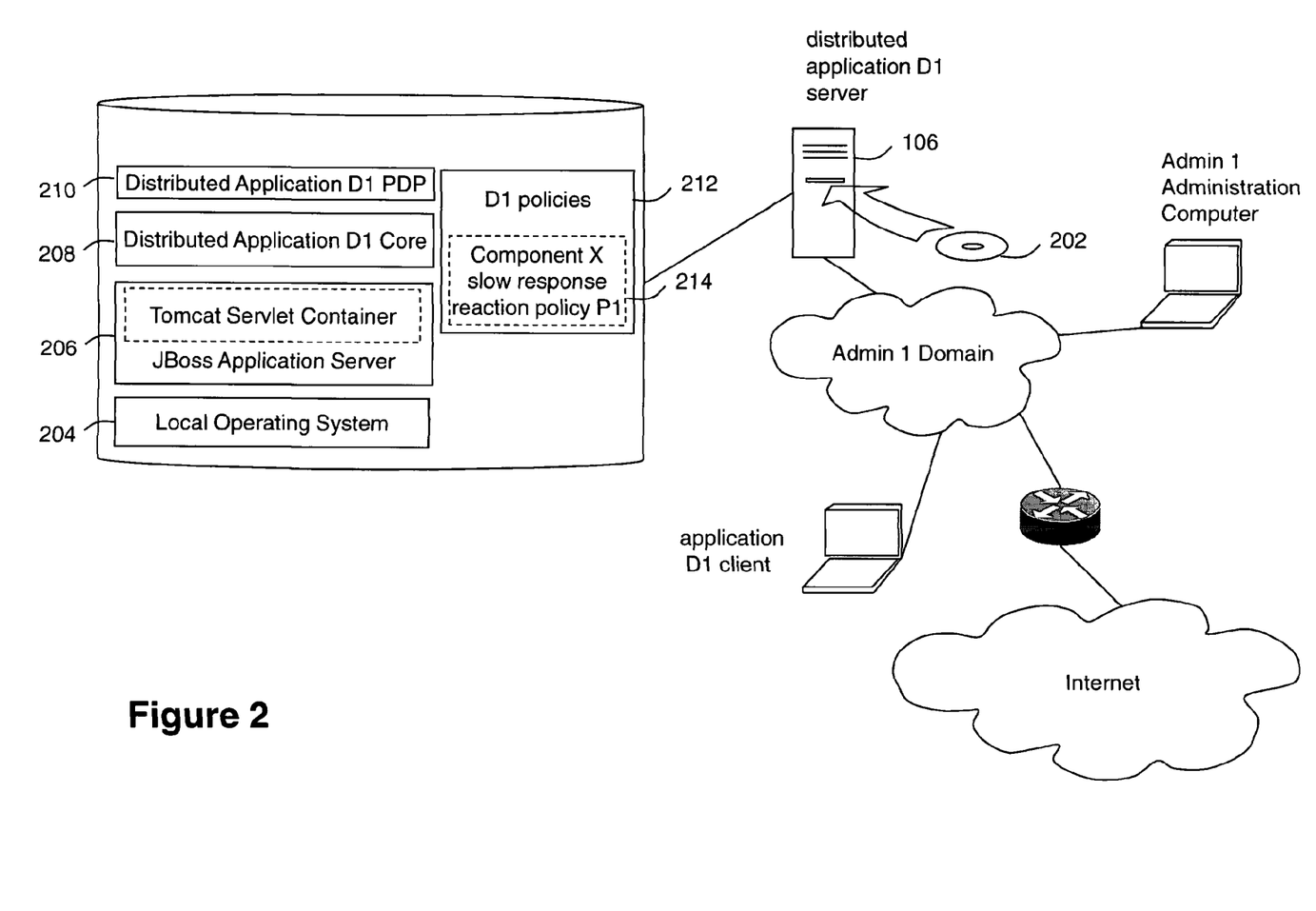
FIG. 2 illustrates a first administrative domain in which a distributed application server computer co-ordinates a first distributed application D1.

FIG. 2 illustrates software programs installed on first distributed application server computer 106 from one or more CD-ROMs 202 (it will of course be realised that such software might be provided using a different form of portable computer readable media, or downloaded from another computer via a network link). First, an operating system program 204 is installed. An application server program 206 (in this case the JBoss application server including the Tomcat servlet container) is also installed on the computer. As will be understood by those skilled in the art, when running, the servlet container program offers an external interface which distributed applications and other programs can use to request so-called life-cycle control of a software component (in this case called a servlet)—for example, the component can be loaded, started or stopped by, for example, an distributed application management program. In the present example, distributed application D1 core program 208 (the part of the distributed program which controls which remote software components are used and in what circumstances) is also loaded on the first distributed application server computer 106.

Finally, a first distributed application management program 210—for managing first distributed application D1—is also installed. Using the first distributed application management program (an example of a so-called policy decision point), the first administrator, or provider of the distributed application program D1, is able to supply policy files 212 (structured management data files as will be explained below) which can affect the flow of control in the first distributed application program. Such policies are useful since an administrator can write a policy and then download that policy to a plurality of devices which play a similar role in the administrator's network—this eases the burden of administration, and reduces the likelihood of mis-configuring devices in the network. In the present example, the provider of distributed application program D1 has provided a component X slow response reaction policy P1 214.

Figure 5:
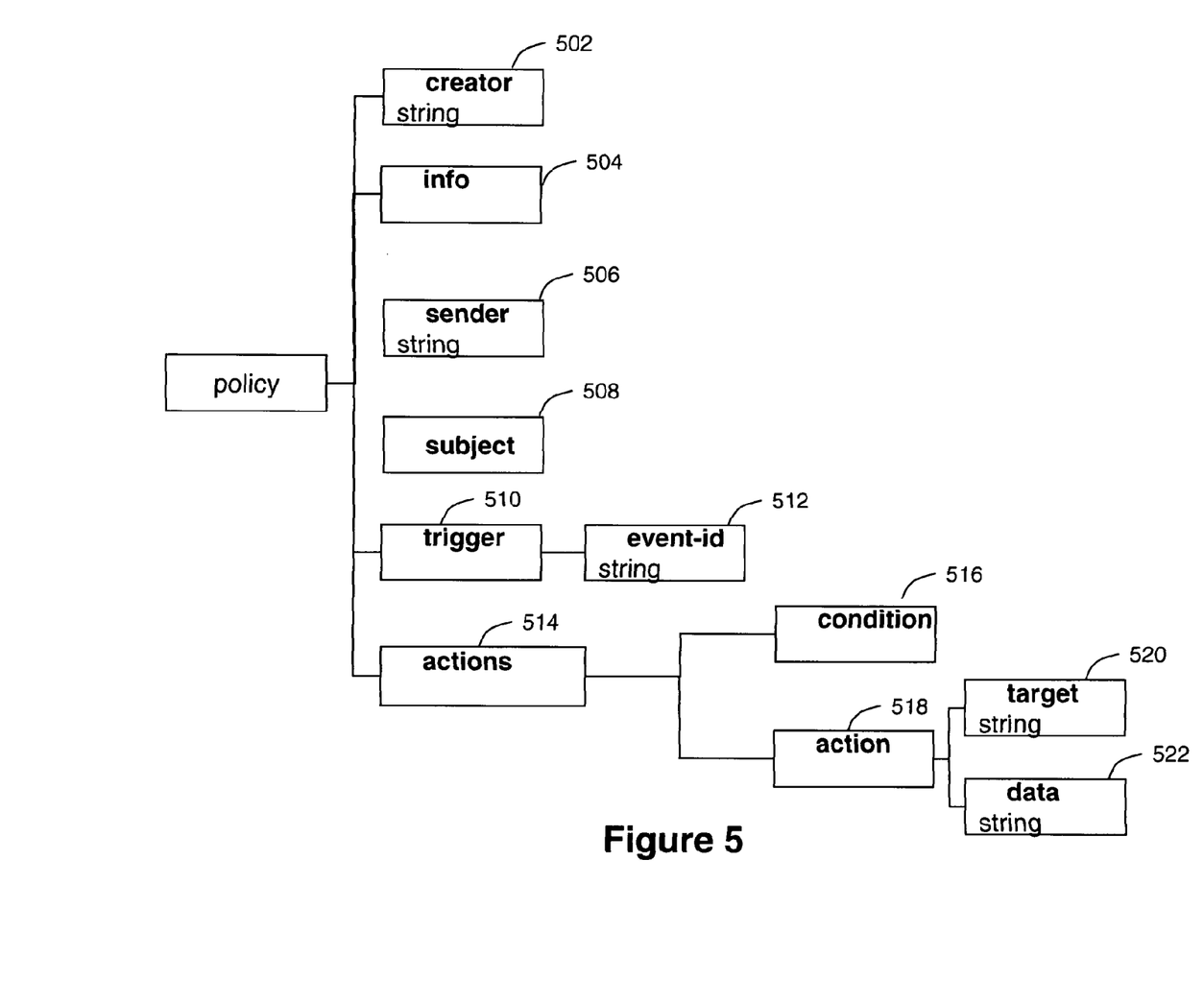
FIG. 5 illustrates a policy structure used in the embodiment.

A schema for policies (i.e. a specification of how a policy document should be structured) for use in this embodiment will be described below with reference to FIG. 5. In accordance with that schema, policies include Event-Condition-Action rules which indicate what Action a policy-based management program should trigger, provided the specified Condition is met, on the arrival of a message indicating the occurrence of an Event. Such rules can be used to control the operation of distributed application programs where event messages are used to advertise noteworthy changes in the state of hardware or software components involved in the performance of the distributed applications to management programs running in the distributed system. Since management programs interpret policy documents whilst the distributed application they control is running, an administrator (or provider of a distributed application) is provided with a straightforward method of altering the operation of a distributed application, without needing to take the distributed application offline (i.e. stop it running), and then unload it, replace it with a modified version and start it again.

Figure 3:
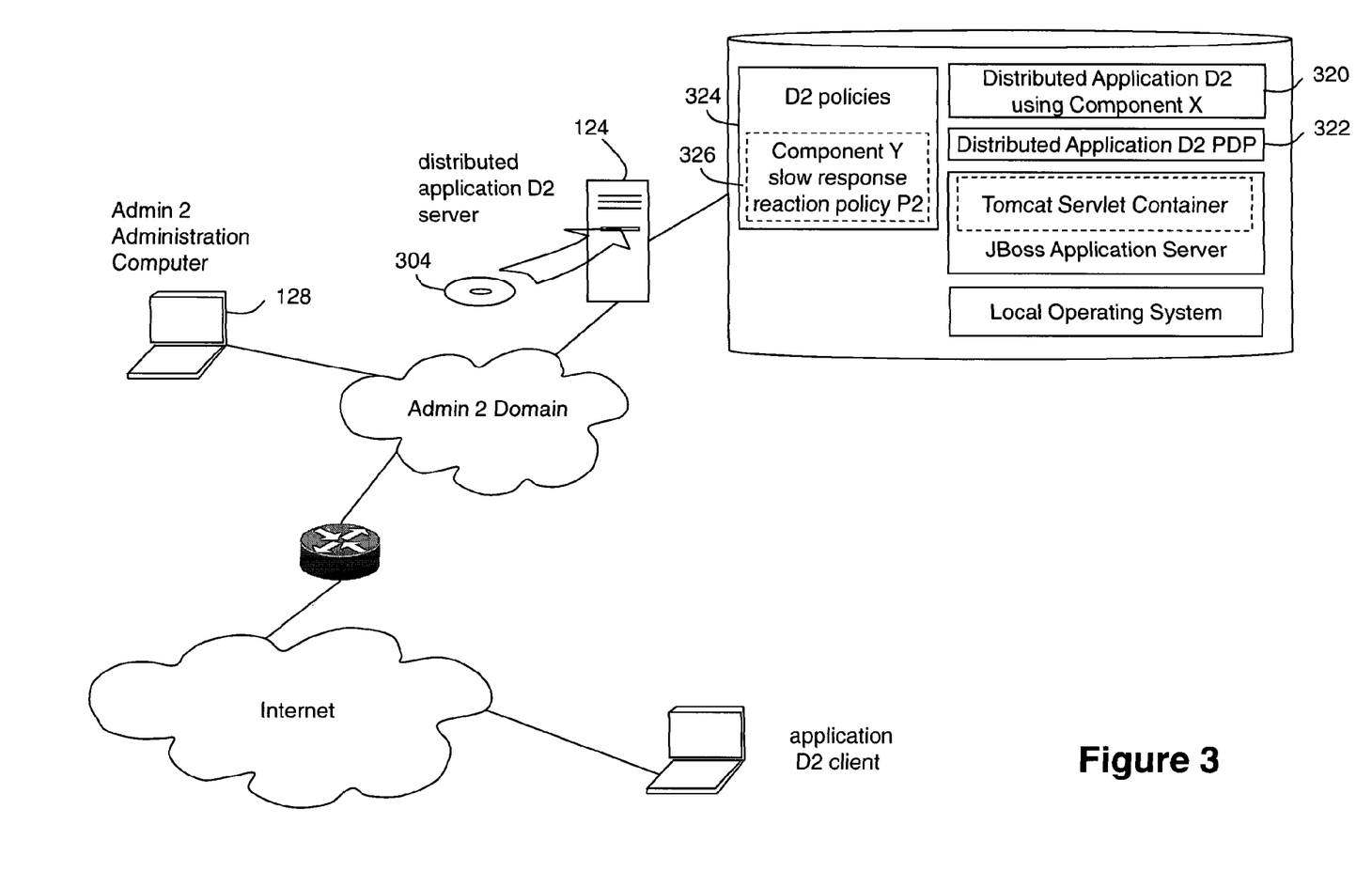
FIG. 3 illustrates a second administrative domain in which a distributed application server computer co-ordinates a second distributed application D2.

FIG. 3 shows that a similar suite of software programs are installed on second distributed application server computer 124 from one or more CD-ROMs 304 (once again, it will of course be realised that such software might be provided using a different form of portable computer readable media, or downloaded from another computer via a network link). However, the second distributed management application program 322 is instead directed to the management of the second distributed application D2, and interprets policies 324 written by the second administrator (or by the provider of distributed application 220) working from second administration computer 128. The provider of second distributed application D2 has provided a component Y slow response reaction policy P2 326. It will be realised that it cannot be expected that there will be any coordination between the providers of the first and second distributed application programs in writing their slow response reaction policies.

The policies 324 are again in accordance with the schema described below in relation to FIG. 5.

Figure 4:
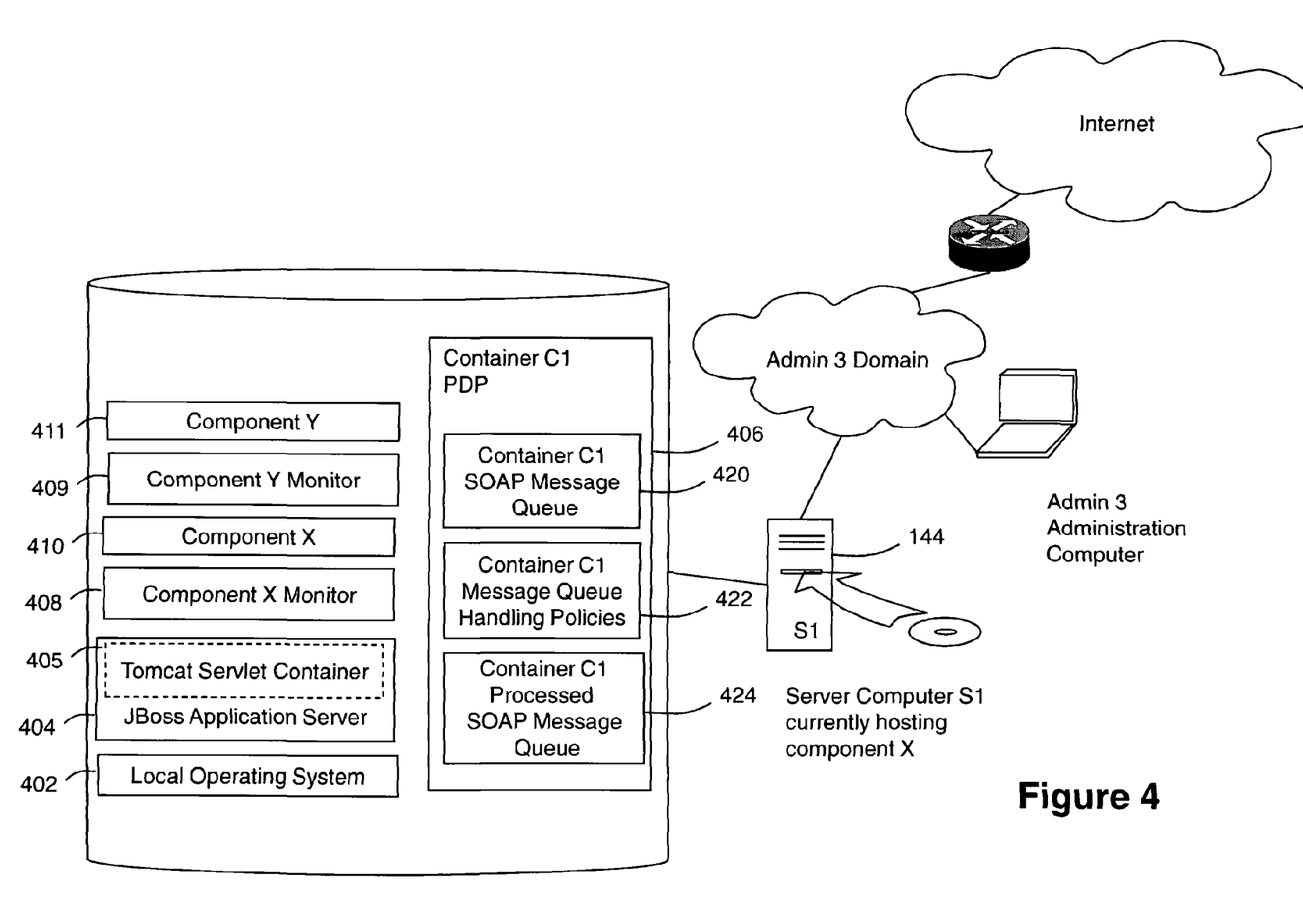
FIG. 4 illustrates a third administrative domain in which a component server computer S1 executes software components for each of distributed application D1 and distributed application D2.

FIG. 4 shows the software installed on component hosting computer 144. As with the first and second distributed application servers 106 and 124, an operating system program 402 and an application server program 404 are installed on the computer (once again the JBoss application server including the Tomcat servlet container 405). As mentioned above, when running, the servlet container program offers an external interface which distributed applications and other programs can use to request so-called life-cycle control of software components running 'in' the container—hence the component can be loaded, started or stopped by, for example, an distributed application management program.

The component hosting computer 144 also has software component X 410 loaded 'into' the Tomcat servlet container so that the servlet container is able to offer external programs management interfaces which they can use for life-cycle control of the component X (other forms of control of component X might also be offered). As well as providing component X, the provider of component X also provides a monitoring component 408 (installed on the software component hosting computer) which monitors the performance of component X (this monitoring component 408 is preferably independent of the component X, and thus less likely to fail together with component X). Should there be a noteworthy change in the performance of component X, then the monitor component 408 will generate an event message indicating the noteworthy change in performance of component X which, as will be understood by those who know about publish/subscribe distributed systems, will be distributed to those programs which have registered an interest in receiving performance event messages from component X. In the present example, this includes the first distributed application management program 210 since performance events affecting the performance of component X might well affect the performance of the first distributed application program D1 as it uses component X to provide part of its functionality.

The component hosting computer 144 also has software component Y 411 loaded 'into' the Tomcat servlet container so that the servlet container is able to offer external programs management interfaces which they can use for life-cycle control of the component Y (other forms of control of component Y might also be offered). As well as providing component Y, the provider of component Y also provides a monitoring component 409 (installed on the software component hosting computer) which monitors the performance of component Y (this monitoring component 409 is preferably independent of the component Y, and thus less likely to fail together with component Y). Should there be a noteworthy change in the performance of component Y, then the monitor component 409 will generate an event message indicating the noteworthy change in performance of component Y which, as will be understood by those who know about publish/subscribe distributed systems, will be distributed to those programs which have registered an interest in receiving performance event messages from component Y. In the present example, this includes the second distributed application management program 322 since performance events affecting the performance of component Y might well affect the performance of the second distributed application program D2 as it uses component Y to provide part of its functionality.

The structure of policies in this example distributed system will now be described with reference to FIG. 5, before returning to FIG. 4. FIG. 5 shows the overall structure of a policy.

The top level policy specification consists of six elements. The creator element 502 allows the origin of a policy to be established. This policy specification is intended to be applicable in an environment where there are multiple points of control. Hardware or software component management applications should be able to accept control from users with different privileges. The provider of first distributed application server computer 106, for example, will have ultimate control of its configuration, including the permitted extent of control by other users. However, the provider of first distributed application D1 may be allowed to control the way the server computer 106 behaves in relation to running the distributed application core program 208. Furthermore, knowledge of the creators of a number of conflicting policies can allow priorities to be set.

The info element 504 contains most of the information about the policy which is not directly related to the policy rules. It includes a globally unique identifier for the policy ("policy-id") and an indication of the modality of the policy (positive authorization-what the subject must do, negative authorization—what the subject may not do or refrain-what the subject should not do). The intention is that the modality should not be mixed within a single policy. The general policy handling components of the management system, which have no detailed knowledge of the specific rules contained in the policy, may then take advantage of this classification. It may also contain a textual description of the policy. The creation time, start time and expiry time of the policy can also be specified. Finally, a list of policies replaced by the current policy may be specified. Policies are considered to be immutable so different versions are not possible. However, a flexible "data" element is provided as discussed in more detail below.

The sender element 506 identifies the forwarding path the policy has taken. This information could be used as a check that the policy has followed an expected route, or to establish that the policy has already been received by other parts of the distributed system.

The subject element 508 identifies those entities (e.g. software components) in the system which are expected to respond to a policy. Identification of these entities is done by role. A role is a name for a group (zero or more members) of related members. This is important so that a policy can refer to entities which are not present or not known at the time of creation if they can subsequently be linked with the role.

The optional trigger element 510 relates an event (via its unique event type identifier "event-id" 512) to the policies that are supposed to handle it. When an event message is received by a management application which has subscribed to such events, relevant policies are activated. It is assumed that a policy is triggered by a single event. If there is no trigger 510 it is assumed that the policy-driven management application is to interpret and act in accordance with the policy as soon as it is received.

Every policy includes one or more actions elements 514. These specify the behaviour (action 518) that should result from the triggering of the policy, to the targets 520 which are defined in the action. Each actions element 514 contains an optional condition expression 516 and a set of strings specifying actions (data 522) to be taken on particular target hardware or software components. These actions can use the open content features of XML schema to allow tags appropriate to any particular system to be included in a policy instance. This is enabled by the data element 522 which can, for example be a reference to a software component and provides a high level of flexibility in defining the policy, without requiring rewriting of the whole policy.

As mentioned above, the first distributed application management program 210 is registered to receive any slow response events which indicate that the response time offered by component X has unexpectedly risen. As mentioned above, the provider of the first distributed application D1 has independently created and stored policies 214 to control the operation of the first distributed application in reaction to receiving a slow response event from the component X monitor.

As also mentioned above, the second distributed application management program 322 is registered to receive any slow response events which indicate that the response time offered by component Y has unexpectedly risen. As mentioned above, the provider of the second distributed application D2 has independently created and stored policies 326 to control the operation of the second distributed application in reaction to receiving a slow response event from the component Y monitor.

In the present example, the action part of the component X slow response reaction policy 214 includes data specifying the generation of a SOAP message, for sending to a Container SOAP message queue program 406 which will be described below. The SOAP message includes commands for the container to stop the component X, then reload the component X and then restart the component X. The SOAP message also includes the event-id of the component X slow response event (all events in the distributed system are structured in accordance with a schema in which events have an ID unique in the distributed system).

Also in the present example, the action part of the component Y slow response reaction policy 326 includes data specifying the generation of a SOAP message, for sending to a Container SOAP message queue program 406 which will be described below. The SOAP message includes commands to stop the container, and then start the container. The SOAP message also includes the event-id of the component Y slow response event (all events in the distributed system are structured in accordance with a schema in which events have an ID unique in the distributed system).

Without the intervention of the Container SOAP message queue processing program 406, the lack of coordination between the two distributed application providers (inherent in policy-managed distributed systems where plural independent administrators are able to inject policies into the distributed system), would lead to a problem if a problem with the Container program were to result in the response time of both component X and component Y rising. In that case, the Component X slow response policy would command the container to stop, restart and reload the component X, and the Component Y slow response policy would command the container to restart itself.

A problem arises in that the end-state of the system will depend upon the order in which the commands from the two distributed applications are carried out by the container. If the 'stop the component X', then 'reload the component X' and then 'restart the component X' commands from the first distributed application server computer 106 arrive first, followed by the stop container and start container instructions from the second distributed application server computer 124, then the component X would end up stopped, and thus the first distributed application might also be stopped—a behaviour which would be a mystery to the provider of the first distributed application. Since providers of distributed applications face severe financial losses for any time their application is down, this unexpected halt in the first distributed application program might be extremely costly.

Returning to FIG. 4, to combat these issues, a Container SOAP message queue processor program is installed on the component hosting computer 144 for the container program. The Container SOAP message queue processor program 406 receives SOAP messages for the Container containing an event-ID. In the present example, it is assumed that events triggered by a single change to the distributed system will arrive in bursts—hence each burst of events is treated as a group of correlated events. The SOAP message queue processor program 406 places all of the SOAP messages in a group in a queue. Given the desire to react to events in the distributed system within a reasonable time frame, a trade-off needs to be made between the inherent delay in reacting to the event which occurs to allow a queue of actions for the event to be built up, and the time which might be gained by not repeating duplicate actions, for example.

The Container SOAP message queue processor program creates and updates two queues for incoming SOAP messages for the Container program 406. The first is an unprocessed queue 420 of SOAP messages, and the second is a processed queue 424 of actions for execution by the Container.

Figure 6:
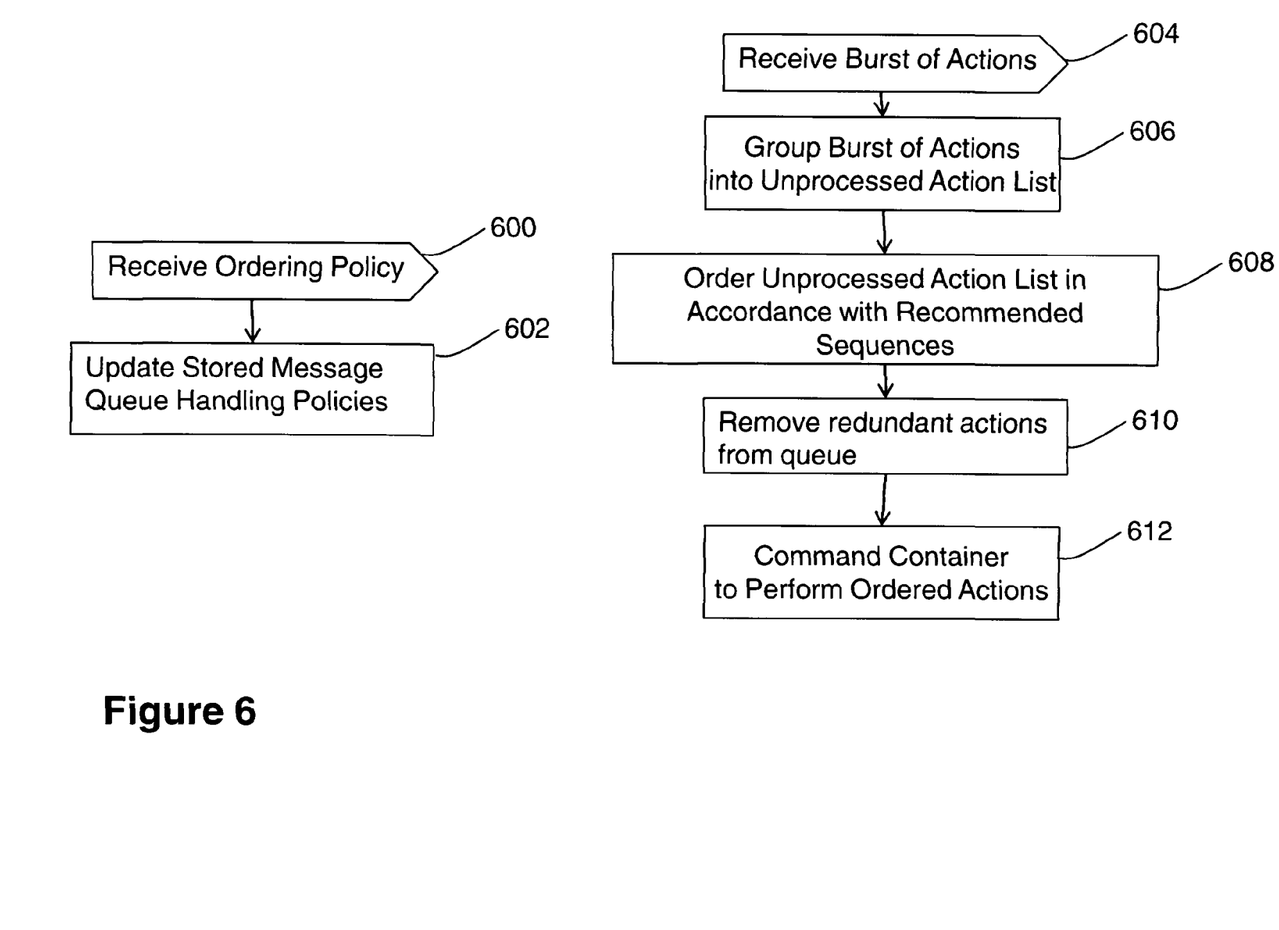
FIG. 6 is a flow-chart showing the operation of a management program for managing the operation of a program supporting the software components used by distributed applications D1 and D2.

FIG. 6 is a flow-chart illustrating the operation of the management program 406 for the Container 405.

The container management program 406 offers a user interface via which an administrator can provide, replace and edit policy documents 422 setting out one or more recommended orders in which actions should be carried out. Those are orders of actions which he considers should result in other administrators seeing the behaviour they expect from the Container when their policies trigger actions on the Container. The policy documents are stored as files on the server computer S1 and can be provided, replaced and edited without a need to stop the container program itself.

The provider of the container might derive the recommended orders of action by analysing the interfaces of the container which can be remotely invoked and the implementation of the container program. If the interfaces of the container which may be remotely invoked are described using an interface description language (e.g. Web Services Description Language), then the provider of the container program would be able to generate a state machine model for the software component using a computer program such as the model checker SPIN. Then the provider can create model processes (for each action in the program's interface which can be remotely invoked) and model their concurrent, non-deterministic execution to discover the system end-state. Using this approach, it is possible at the time the program is designed to partition the component's interface into a set of safe actions whose ordering would not affect the end state of the system, and one or more sets of recommended orders for actions whose ordering would affect the end state of the system. In some cases, the partitioning will depend on the values of the input parameters so a single method offering by the component might be represented as more than one action (an action here being defined as a method with input parameters within specified ranges).

On receiving 600 an ordering policy update (which might be an entirely new policy), the management program 406 updates the message queue handling policy documents 422 stored on the server computer S1.

Occasionally, during its operation, the management program 406 receives 604 a burst of SOAP messages deemed to relate to a single change to the distributed system. The management program then groups 606 the received burst of collected actions into an unprocessed action list.

The management program 406 then applies the current queue ordering policies 422 to order 608 actions in the queue. Thereafter, redundant actions are removed 610 from the queue, to generate a processed queue 424 of actions. The Container program is then commanded 612 to process the processed queue of actions in the calculated order (in this step, the management program is playing the role of a Policy Execution Point).

Figure 7:
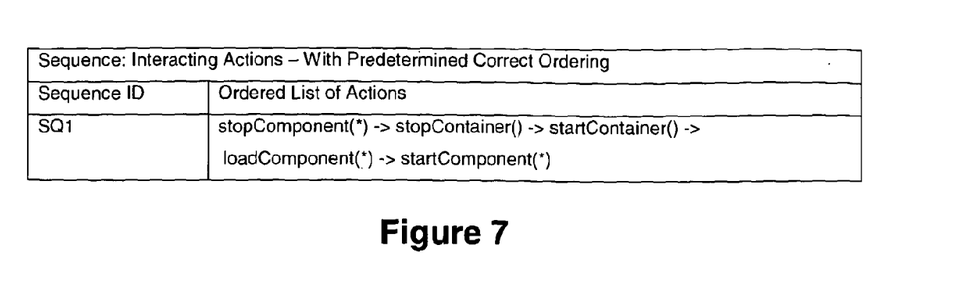
FIG. 7 illustrates structured action sequencing data stored at the component server computer S1.

By way of example of the use of this embodiment, the administrator of the component might load an ordering policy for the Container which specifies that the stop component, reload component and start component actions offered as part of the container program's application programming interface should be executed after any container restart action (also offered by the container program's API) to achieve a predictable end-state. A table illustrating this ordering policy is seen in FIG. 7.

Continuing the example explained above, if a problem arises with the Container, and a slow response event messages for component X is sent to the PDP program for the first distributed application program and a corresponding message for component Y is sent to the PDP program for the second distributed application, and then the PDP program for the first distributed application sends a SOAP message containing actions—stop the component X, then reload the component X and then restart the component X, and the PDP program for the second distributed application sends a SOAP message containing actions—stopContainer( ) and startContainer( ).

Figure 8:
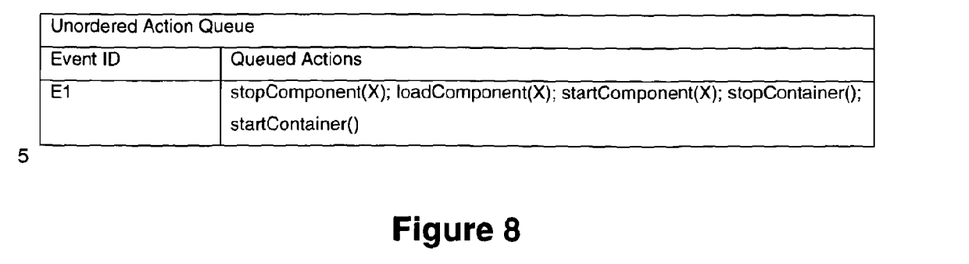
FIG. 8 illustrates an example unordered set of actions which might arrive at component server computer S1 in response to an event notified to distributed application computers D1 and D2.

Since the two SOAP messages will arrive more closely to one another than to SOAP messages uncorrelated with the performance problem with the Container program, the container management program will group the two messages to generate an unprocessed action list. If the SOAP message from the PDP program for the first distributed application arrives first, then the unprocessed event-specific queue will be as shown in FIG. 8. The ordering step 608 will find that the best match for the set of actions in the unprocessed action list is sequence SQ1 (FIG. 7) and place the actions in the processed event-specific queue in the order stopContainer( ); startContainer( ); stopComponent(X); loadComponent(X); startComponent(X).

Figure 9:
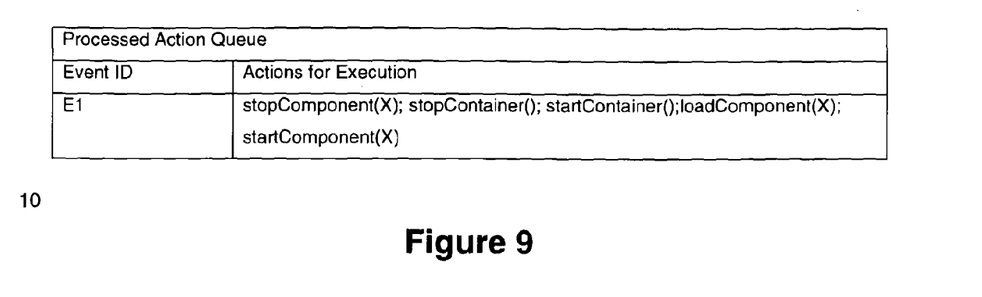
FIG. 9 shows the action queue following the carrying out of the operation of FIG. 6 on the unordered set of actions seen in FIG. 9.

Since, the resultant action list contains no redundant actions in the present example, this will lead to the action schedule seen in FIG. 9 being requested of the container 405.

Figure 10:
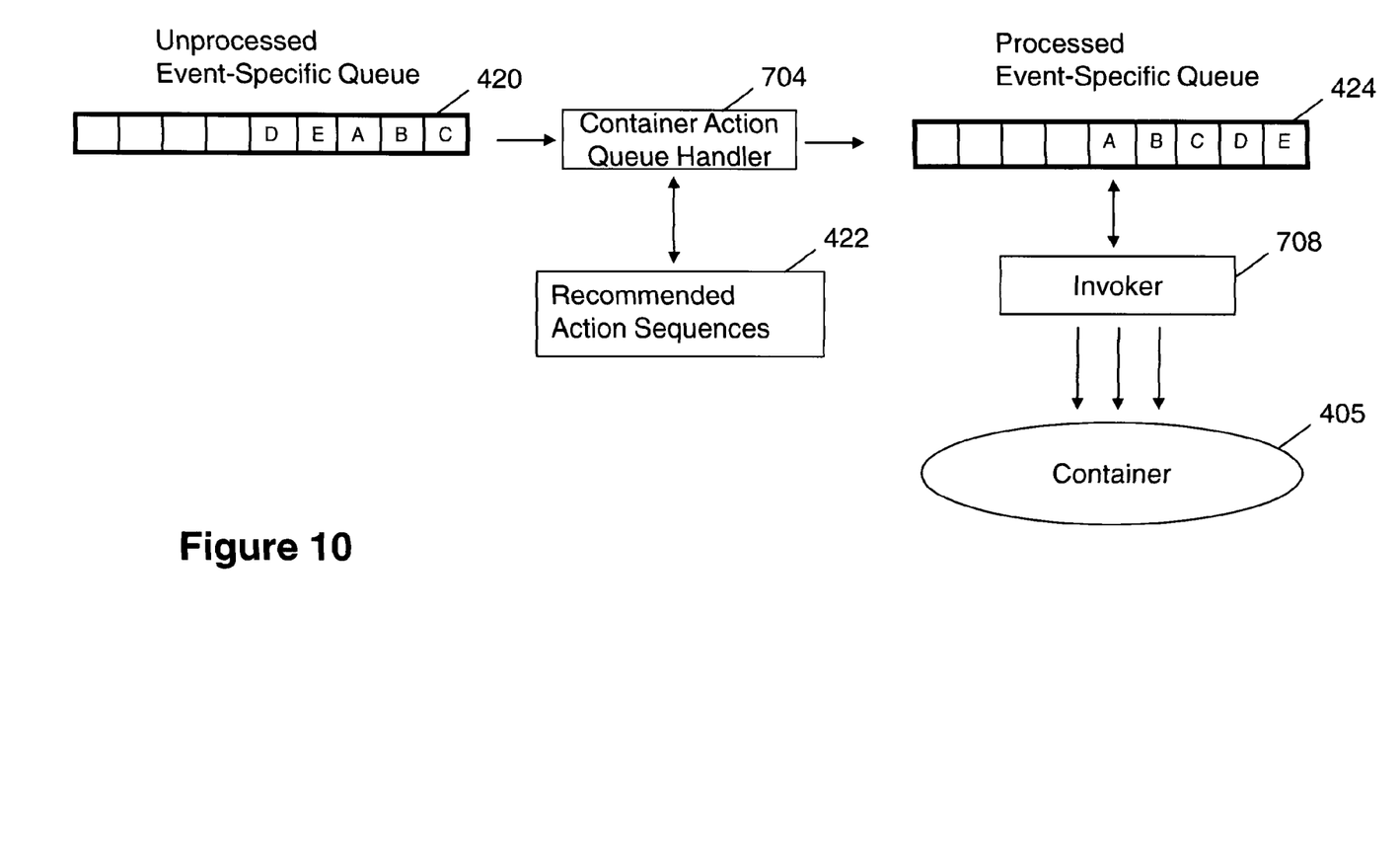
FIG. 10 shows the data structures, interfaces and functional modules of the management program whose operation is illustrated in FIG. 6.

FIG. 10 provides a diagrammatic illustration of the functional modules and data structures of the container management program 406.

It will be seen how the above embodiment avoids a potentially chaotic response to a single change in the distributed system, by ensuring that a group of actions triggered by that single change are carried out in accordance with a recommended order prepared by the provider of the program which offers the actions being requested.

Variations on the above-described embodiment include (this list is by no means exhaustive):

i) in the above example, the controlled entities where software entities. In other embodiments, hardware entities, or a combination of hardware entities and software entities might be controlled.

ii) in the above example, SOAP messages are arranged into groups by identifying messages which occur in a burst as belonging to a group. In other embodiments, they might be placed in queues in dependence on the event-ID included in the SOAP message.

iii) in the above example, the recommended sequences of actions were themselves provided as part of a policy document. However, in other embodiments, the recommended sequences of actions are provided in another form.

iv) in the above embodiment, the message queue handling policies are stored on the server computer S1. In other embodiments, they might be stored on a different computer.

v) In the above embodiment, the sorting and conflict resolution carried out to generate the processed event-specific queue was carried out prior to execution of any member of that list.

However, for reasons of speed in some embodiments actions placed in the processed event-specific queue are executed immediately.

vi) in the above example, the application programming interface offered by the managed program included an action—stopContainer( )—which conflicted with all other actions—in the sense that all other actions offered by the managed programs should either precede it (e.g. actions to stop components running in the container), or succeed it (all the other actions). However, in many embodiments the managed program will offer actions which do not conflict with any other actions offered by the managed program. In such a case, the program managing the managed program can be improved by additionally allowing the administrator to define sets of such non-conflicting actions, store those sets, and then additionally, on receiving a request to perform an action, first finding whether the requested action is included with the set of non-conflicting actions, and if it is, immediately commanding the managed program to perform that action.

The invention claimed is:

1. A method of operating a distributed system, said method comprising:
receiving action sequence data representing one or more recommended sequences of actions for a managed entity in said distributed system, wherein said managed entity runs on a computer;
operating a first processor located on a first server to respond to an occurrence of an event in said distributed system by sending one or more action requests to said managed entity, each of said one or more action requests representing a request for said managed entity to carry out an action;
operating a second processor located on a second server remote from the first server to respond to said occurrence of said event in said distributed system by sending one or more other action requests to said managed entity, each of said one or more other action requests representing a request for said managed entity to carry out an action;
collecting a plurality of said action requests from said first and second processors, the plurality of action requests being such that the end-state of said managed entity depends upon the order in which the one or more action requests from the first processor are carried out relative to the one or more action requests from the second processor;
generating, from said collection of action requests, a schedule of actions in accordance with said action sequence data; and
operating said managed entity to perform actions in accordance with said schedule.

2. The method according to claim 1 further comprising generating event messages for distribution in said distributed system in response to the occurrence of events pertaining to the performance of a software or hardware component of said distributed system.

3. The method according to claim 2 further comprising storing rules which set out one or more actions to be carried out by said managed entity in response to the generation of an event message in said distributed system.

4. The method according to claim 3 wherein said rules are accompanied by one or more conditions, and said action is requested only on said condition being met.

5. The method according to claim 1 wherein said managed entity is a software process or software application running on the computer.

6. The method according to claim 5 wherein said actions are calls to methods or procedures offered by said software to other software in said distributed system.

7. The method according to claim 1, wherein the distributed system comprises a plurality of administrative domains interconnected via the Internet.

8. The method according to claim 7, wherein the administrative domain includes a server.

9. A method of operating a computing node in a distributed system, said method comprising:
receiving action sequence data representing one or more recommended sequences of actions for a managed entity in said distributed system, wherein said managed entity runs on a computer;
collecting a plurality of action requests from two or more processors in said distributed system, each of said plurality of action requests representing a request for said managed entity to carry out an action in response to the occurrence of an event in said distributed system, the plurality of action requests being such that the end-state of said managed entity depends upon the order in which the one or more action requests from one of the two or more processors are carried out relative to the one or more action requests from another of the two or more processors;
generating, from said collection of action requests, a schedule of actions in accordance with said action sequence data; and
sending instructions to said managed entity to perform actions in accordance with said schedule.

10. A non-transitory computer readable medium storing encoded instructions executable by a computer to control said computer to:
receive action sequence data representing one or more recommended sequences of actions for a managed entity in a distributed system, wherein said managed entity runs on a computer;
collect a plurality of action requests from two or more processors, each of said plurality of action requests representing a request for said managed entity to carry out an action in response to the occurrence of an event in said distributed system, the plurality of action requests being such that the end-state of said managed entity depends upon the order in which the one or more action requests from one of the two or more processors are carried out relative to the one or more action requests from another of the two or more processors;
generate, from said collection of action requests, a schedule of actions in accordance with said action sequence data; and
send instructions to said managed entity to perform actions in accordance with said schedule.

11. A computing node for use in a distributed system comprising:
a processor and associated memory, said memory storing:
software component code executable to provide a plurality of available actions to software components running on two or more other computing nodes in said distributed system;
recommended action order reception code executable to receive order data indicative of a recommended order for carrying out two or more of said plurality of available actions;
action request assembly code executable to store, in said memory, an assemblage of requests for one or more of said actions made available by said software component, said requests having been received from said two or more computing nodes, the assemblage of requests being such that the end-state of said computing node depends upon the order in which the one or more actions requested by one of said two or more other nodes are carried out relative to the one or more actions requested by another of said two or more other nodes; and action request assemblage processing code executable to order and/or filter said assemblage of action requests to generate a schedule of action requests for execution by said software component, said schedule having said assemblage of actions ordered in accordance with the recommended order indicated by said order data.

12. A computing node for use in a distributed system comprising:

a processor and associated memory, said memory storing:

software component code executable to provide a plurality of available actions to software components running on two or more other computing nodes in said distributed system;

action request assembly code executable to store, in said memory, an assemblage of requests for one or more of said actions made available by said software component, said requests having been received from said two or more other computing nodes, said requests being such that the end-state of said computing node depends upon the order in which the one or more actions requested by one of said two or more other computing nodes are carried out relative to the actions requested by another of said two or more other computing nodes;

action request assemblage processing code executable to order and/or filter said assemblage of action requests in dependence upon the actions requested and said order data to generate a schedule of action requests for execution by said software component, said schedule having said assemblage of actions ordered in accordance with the recommended order indicated by said order data; and component monitoring code executable to generate an event message for distribution in said distributed system in response to the occurrence of an event pertaining to the performance of said software component, wherein said plurality of action requests are received from other computers in said distributed system in reaction to the distribution of said event message.

* * * * *